US008383744B2

(12) United States Patent
Justynska et al.

(10) Patent No.: US 8,383,744 B2
(45) Date of Patent: Feb. 26, 2013

(54) ACTINICALLY-CROSSLINKABLE SILOXANE-CONTAINING COPOLYMERS

(75) Inventors: Justyna Justynska, Trondheim (NO); Bernhard Seiferling, Goldbach (DE)

(73) Assignee: Novartis AG, Basel (CH)

( * ) Notice: Subject to any disclaimer, the term of this patent is extended or adjusted under 35 U.S.C. 154(b) by 323 days.

(21) Appl. No.: 12/783,591

(22) Filed: May 20, 2010

(65) Prior Publication Data

US 2010/0296049 A1   Nov. 25, 2010

Related U.S. Application Data

(60) Provisional application No. 61/180,449, filed on May 22, 2009.

(51) Int. Cl.
*C08F 30/08* (2006.01)
(52) U.S. Cl. .................... 526/279; 351/160 R
(58) Field of Classification Search .................. 526/279; 351/160 R
See application file for complete search history.

(56) References Cited

U.S. PATENT DOCUMENTS

| | | |
|---|---|---|
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,327,203 A | 4/1982 | Deichert |
| 4,341,889 A | 7/1982 | Deichert |
| 4,343,927 A | 8/1982 | Chang |
| 4,355,147 A | 10/1982 | Deichert |
| 4,444,711 A | 4/1984 | Schad |
| 4,460,534 A | 7/1984 | Boehm |
| 4,486,577 A | 12/1984 | Mueller |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,711,943 A | 12/1987 | Harvey, III |
| 4,833,218 A | 5/1989 | Lee |
| 4,837,289 A | 6/1989 | Mueller |
| 4,954,586 A | 9/1990 | Toyoshima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,079,319 A | 1/1992 | Mueller |
| 5,227,432 A | 7/1993 | Jung |
| 5,244,981 A | 9/1993 | Seidner |
| 5,314,960 A | 5/1994 | Spinelli |
| 5,314,961 A | 5/1994 | Anton |
| 5,331,067 A | 7/1994 | Seidner |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,449,729 A | 9/1995 | Lai |
| 5,451,617 A | 9/1995 | Lai |
| 5,486,579 A | 1/1996 | Lai |
| 5,508,317 A | 4/1996 | Müller |
| 5,512,205 A | 4/1996 | Lai |
| 5,583,163 A | 12/1996 | Müller |
| 5,621,018 A | 4/1997 | Chabrecek |
| 5,665,840 A | 9/1997 | Pöhlmann |
| 5,712,356 A | 1/1998 | Bothe |
| 5,760,100 A | 6/1998 | Nicolson |
| 5,789,464 A | 8/1998 | Müller |
| 5,843,346 A | 12/1998 | Morrill |
| 5,849,810 A | 12/1998 | Müller |
| 5,849,811 A | 12/1998 | Nicolson |
| 5,849,841 A | 12/1998 | Mühlebach |
| 5,894,002 A | 4/1999 | Boneberger |
| 5,959,117 A | 9/1999 | Ozark |
| 5,962,548 A | 10/1999 | Vanderlaan |
| 5,981,615 A | 11/1999 | Meijs |
| 5,981,669 A | 11/1999 | Valint, Jr. |
| 5,981,675 A | 11/1999 | Valint, Jr. |
| 6,039,913 A | 3/2000 | Hirt |
| 6,165,408 A | 12/2000 | Steinmann |

(Continued)

FOREIGN PATENT DOCUMENTS

| | | |
|---|---|---|
| EP | 0425436 A2 | 5/1991 |
| EP | 0958315 B1 | 6/2001 |
| EP | 0932635 B1 | 7/2001 |
| EP | 0961941 B1 | 4/2002 |
| WO | 9700274 A1 | 1/1997 |
| WO | 99/33894 | 7/1999 |
| WO | 00/31150 | 6/2000 |
| WO | 2008008752 A2 | 1/2008 |
| WO | 2008116131 A2 | 9/2008 |
| WO | 2008/008752 * | 1/2012 |

OTHER PUBLICATIONS

PCT International Search Report dated Aug. 26, 2010 for International Application No. PCT/EP2010/056990, International Filing Date May 20, 2010.

(Continued)

*Primary Examiner* — Margaret Moore
(74) *Attorney, Agent, or Firm* — Jian Zhou

(57) ABSTRACT

The invention provide a class of actinically-crosslinkable silicone-containing prepolymers which comprise dangling polysiloxane chains each having a terminal ethylenically-unsaturated group and are obtained in a one-step of RAFT polymerization of a reactive mixture comprising a polysiloxane crosslinker, a hydrophilic vinylic monomer, a RAFT agent, and a free-radical initiator. The present invention is also related to silicone hydrogel contact lenses made from a prepolymer of the invention and methods for making the contact lenses in a cost-effective way and with high consistency and high fidelity to the original lens design.

19 Claims, No Drawings

U.S. PATENT DOCUMENTS

| | | | |
|---|---|---|---|
| 6,221,303 B1 | 4/2001 | Steinmann |
| 6,303,687 B1 | 10/2001 | Müller |
| 6,367,929 B1 | 4/2002 | Maiden |
| 6,472,489 B1 | 10/2002 | Stockinger |
| 6,479,587 B1 | 11/2002 | Stockinger |
| 6,492,478 B1 | 12/2002 | Steinmann |
| 6,627,124 B1 | 9/2003 | Herbrechtsmeier |
| 6,719,929 B2 | 4/2004 | Winterton |
| 6,762,264 B2 | 7/2004 | Künzler |
| 6,800,225 B1 | 10/2004 | Hagmann |
| 6,822,016 B2 | 11/2004 | McCabe |
| 6,995,192 B2 | 2/2006 | Phelan |
| 7,238,750 B2 | 7/2007 | Müller |
| 7,256,246 B2 | 8/2007 | Kindt-Larsen |
| 7,384,590 B2 | 6/2008 | Kelly |
| 7,387,759 B2 | 6/2008 | Kelly |
| 7,942,929 B2 * | 5/2011 | Linhardt et al. ............ 623/6.62 |
| 2004/0082680 A1 | 4/2004 | Phelan |
| 2005/0113549 A1 | 5/2005 | Devlin |
| 2006/0036052 A1 | 2/2006 | Kindt-Larsen |
| 2006/0235162 A1 | 10/2006 | Muller |
| 2008/0015315 A1 | 1/2008 | Chang |
| 2008/0143958 A1 | 6/2008 | Medina |
| 2008/0174035 A1 | 7/2008 | Winterton |
| 2008/0231798 A1 | 9/2008 | Zhou |
| 2009/0230575 A1 | 9/2009 | Liu |

OTHER PUBLICATIONS

PCT Written Opinion of the International Searching Authority dated Aug. 26, 2010 for International Application No. PCT/EP2010/056990, International Filing Date May 20, 2010.

* cited by examiner

ACTINICALLY-CROSSLINKABLE SILOXANE-CONTAINING COPOLYMERS

This application claims the benefit under 35 U.S.C. §119 (e) of U.S. provisional application Ser. No. 61/180,449 filed on May 22, 2009, herein incorporated by reference in its entirety.

The present invention is related to a class of silicone-containing prepolymers and methods for making the same. In addition, the present invention is related to silicone hydrogel contact lenses made from this class of silicone-containing prepolymers.

BACKGROUND

In recent years, soft silicone hydrogel contact lenses become more and more popular because of their high oxygen permeability and comfort. Most commercially available silicone hydrogel contact lenses are produced according to a conventional cast molding technique involving use of disposable plastic molds and a mixture of monomers in the presence or absence of macromers. However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Such disadvantages encountered in a conventional cast-molding technique can be overcome by using the so-called Lightstream Technology™ (CIBA Vision), as illustrated in U.S. Pat. Nos. 5,508,317, 5,789,464, 5,849,810, and 6,800,225, which are incorporated by reference in their entireties. The Lightstream Technology™ involves (1) a lens-forming composition which is typically a solution of one or more substantially purified prepolymer with ethylenically unsaturated groups and which generally is substantially free of monomers and crosslinking agents with a small molecular weight, (2) reusable molds produced in high precision, and (3) curing under a spatial limitation of actinic radiation (e.g., UV). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield.

In order to fully utilize the Lightstream Technology™ to make silicone hydrogel contact lenses, there is still a need for new actinically-crosslinkable prepolymers suitable for making silicone hydrogel contact lenses according to the Lightstream Technology™.

SUMMARY OF THE INVENTION

In one aspect, the invention provides an actinically crosslinkable prepolymer. The prepolymer of the invention is a RAFT polymerization product of a reactive mixture comprising a polysiloxane crosslinker with two terminal vinyl-groups, a hydrophilic vinylic monomer, a RAFT agent, and a free-radical initiator, wherein the prepolymer comprises: (1) polysiloxane crosslinking units derived from the polysiloxane crosslinker both the two terminal vinyl-groups of which undergo the RAFT polymerization; (2) hydrophilic units derived from a hydrophilic vinylic monomer; (3) dangling polysiloxane chains with one terminal vinyl group, wherein the dangling polysiloxane chains are derived from the polysiloxane crosslinker one of the two terminal vinyl-groups of which undergoes the RAFT polymerization while the other remains unreacted, wherein the prepolymer is capable of being actinically crosslinked, in the absence of one or more vinylic monomers, to form a silicone hydrogel material.

In another aspect, the invention provides a soft contact lens made from a lens-forming material including an actinically-crosslinkable prepolymer of the invention.

In a further aspect, the invention provides a method for producing soft contact lenses from an actinically-crosslinkable prepolymer of the invention.

The invention also provides a method for preparing an actinically-crosslinkable prepolymer of the invention.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "vinylic monomer", as used herein, refers to a monomer that has one sole ethylenically unsaturated group and can be polymerized actinically or thermally.

The term "olefinically unsaturated group" or "ethylenically unsaturated group" is intended to encompass any groups containing a >C=C< group. Exemplary ethylenically unsaturated groups include without limitation allyl,

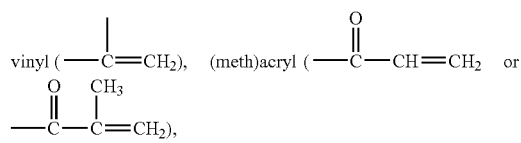

styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

The term "RAFT" refers to radical addition-fragmentation transfer or reversible addition fragmentation chain transfer, as understood by a person skilled in the art.

A "RAFT agent" refers to a compound of

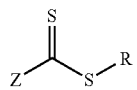

in which R is a leaving group and has its traditional meanings as understood by one skilled in the art; Z is an activating group and has its traditional meanings as understood by one skilled in the art.

The term "fluid" as used herein indicates that a material is capable of flowing like a liquid.

A "hydrophilic vinylic monomer" refers to a vinylic monomer which can be polymerized to form a polymer that is water-soluble or can absorb at least 10 percent by weight of water.

A "hydrophobic vinylic monomer", as used herein, refers to a vinylic monomer which is polymerized to form a polymer that is insoluble in water and can absorb less than 10 percent by weight water.

A "macromer" refers to a medium and high molecular weight compound which can be polymerized and/or crosslinked. Medium and high molecular weight typically means average molecular weights greater than 700 Daltons.

A "vinylic macromer" refers to a macromer which can be polymerized actinically and comprises one or more ethylenically unsaturated groups.

A "prepolymer" refers to a starting polymer which contains three or more ethylenically unsaturated groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "ethylenically functionalize" in reference to a copolymer or a compound is intended to describe that one or more actinically crosslinkable groups have been covalently attached to a copolymer or compound through the pendant or terminal functional groups of the copolymer or the compound according to a coupling process.

As used herein, the term "multiple" refers to three or more.

A "photoinitiator" refers to a chemical that initiates radical crosslinking/polymerizing reaction by the use of light.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. Nos. 6,800,225 (FIGS. 1-11), and 6,627,124 (FIGS. 1-9), 7,384,590 (FIGS. 1-6), and 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is a radiation energy, especially UV radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surface of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a lens-forming fluid material and that is used to impart color. Dyes are typically translucent and absorb but do not scatter light.

A "pigment" means a powdered substance (particles) that is suspended in a lens-forming fluid material in which it is insoluble.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified.

Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Patent Application No. 60/811,949 (herein incorporated by reference in its entirety), and a hydrophilic coating composed of covalent attachment or physical deposition of one or more layers of one or more hydrophilic polymer onto the surface of a contact lens.

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by Wilhelmy Plate method), which is obtained by averaging measurements of at least 3 individual contact lenses.

An "antimicrobial agent", as used herein, refers to a chemical that is capable of decreasing or eliminating or inhibiting the growth of microorganisms such as that term is known in the art. Preferred examples of antimicrobial agent include without limitation silver salts, silver complexes, silver nanoparticles, silver-containing zeolites, and the likes "Silver nanoparticles" refer to particles which is made essentially of silver metal and have a size of less than 1 micrometer.

A "UV absorber" refers to a compound comprising a Ultraviolet absorbing ("UV-absorbing") moiety capable of absorbing or screening out UV radiation in the region of 200 to 400 nm.

The intrinsic "oxygen permeability", Dk, of a material is the rate at which oxygen will pass through a material. In accordance with the invention, the term "oxygen permeability (Dk)" in reference to a material or a contact lens means an apparent oxygen permeability which is measured with a sample (film or lens) having an average thickness over the area being measured according to a coulometric method described in Examples. Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

The "ion permeability" through a lens correlates with the Ionoflux Diffusion Coefficient. The Ionoflux Diffusion Coefficient, D (in units of [mm²/min]), is determined by applying Fick's law as follows:

$$D = -n'/(A \times dc/dx)$$

where n'=rate of ion transport [mol/min]; A=area of lens exposed [mm²]; dc=concentration difference [mol/L]; dx=thickness of lens [mm].

In general, the invention is directed to a class of actinically crosslinkable silicone-containing prepolymers with dangling polysiloxane chains having a terminal vinyl-group. Such prepolymers can be used to prepare silicone hydrogel contact lenses, in particularly according to the Lightstream Technology™ (CIBA Vision).

There are several potential unique features associated with use of prepolymers of the invention in making silicone hydrogel contact lens. First, a prepolymer of the invention is obtained according to a simple one-pot method. Resultant prepolymers from RAFT polymerization of a reactive mixture comprises ethylenically unsaturated groups and thereby there is no need for further chemical modification of the resultant copolymers to introduce ethylenically unsaturated groups. Second, a lens-forming formulation (polymerizable composition) can be a solution of the prepolymer which has been substantially purified (i.e., removing substantially starting materials for making the prepolymer). No lens extraction is necessary after curing of the lens. Fourth, a prepolymer of the invention can be cured actinically on a timescale of seconds. As such, prepolymers of the invention can fully utilize the advantages provided by the Lightstream Technology™ in make silicone hydrogel contact lenses at a relatively lower cost and at high consistency and high fidelity to the original lens design.

In one aspect, the invention provides an actinically crosslinkable prepolymer. The prepolymer of the invention is a RAFT polymerization product of a reactive mixture comprising a polysiloxane crosslinker with two terminal vinyl-groups, a hydrophilic vinylic monomer, a RAFT agent, and a free-radical initiator, wherein the prepolymer comprises: (1) polysiloxane crosslinking units derived from the polysiloxane crosslinker both the two terminal vinyl-groups of which undergo the RAFT polymerization; (2) hydrophilic units derived from a hydrophilic vinylic monomer; (3) dangling polysiloxane chains with one terminal vinyl group, wherein the dangling polysiloxane chains are derived from the polysiloxane crosslinker one of the two terminal vinyl-groups of which undergoes the RAFT polymerization while the other remains unreacted, wherein the prepolymer is capable of being actinically crosslinked, in the absence of one or more monomers, to form a silicone hydrogel material.

A "polysiloxane crosslinker" refers to a compound or polymer containing at least two ethylenically unsaturated groups and a divalent radical of

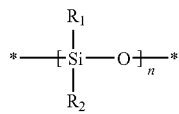

in which $R_1$ and $R_2$ are independently a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, trimethylsiloxyl, -alk-(OCH$_2$CH$_2$)$_m$—OR$_3$ in which alk is $C_1$-$C_6$ alkylene divalent radical, $R_3$ is hydrogen or $C_1$-$C_6$ alkyl, and m is an integer of from 1 to 10; n is an integer of 2 to 800.

Any suitable polysiloxane crosslinkers can be used in the invention. Examples of such polysiloxane crosslinkers are dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; (meth)acrylamide-terminated polydimethylsiloxanes; (meth)acrylate-terminated polydimethylsiloxanes; bis-3-methacryloxy-2-hydroxypropyloxypropyl polydimethylsiloxane; N,N,N', N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyalkyleneoxides could also be of utility. For example one might use (meth)acrylate end capped polyethyleneoxide-block-polydimethylsiloxane-block-polyethyleneoxide to enhance oxygen permeability.

In a preferred embodiment, the reactive mixture comprises a polysiloxane crosslinker of formula (1)

$$Q\text{-}X_1\text{-}A_1\text{-}PDMS\text{-}A_2\text{-}X_2\text{-}Q \tag{1}$$

in which
  $A_1$ and $A_2$ independent of each other is a linear or branched $C_1$-$C_{10}$ alkyl diradical which optionally comprises one or more hydroxyl or amino groups;
  $X_1$ and $X_2$ independent of each other are a linkage selected from the group consisting of a direct bond,

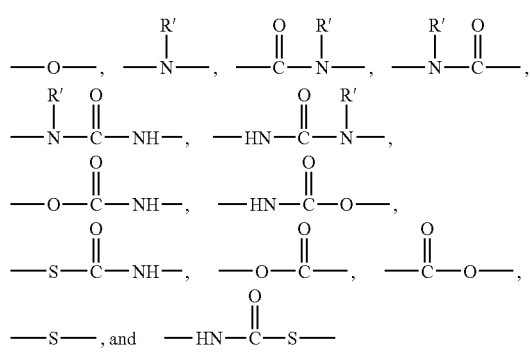

in which R' is H or $C_1$-$C_8$ alkyl;
  PDMS is a polysiloxane divalent radical of formula (2)

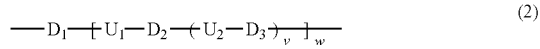

in which v is 0 or 1, ω is an integer of from 0 to 5, $U_1$ and $U_2$ independent of each other represent a divalent radical of —R'$_1$—$X_3$-E-$X_4$—R'$_2$— n which R'$_1$ and R'$_2$ independent of each other is a linear or branched $C_1$-$C_{10}$ alkylene divalent radical, $X_4$ and $X_5$ independent of each other are a linkage selected from the group consisting of —O—,

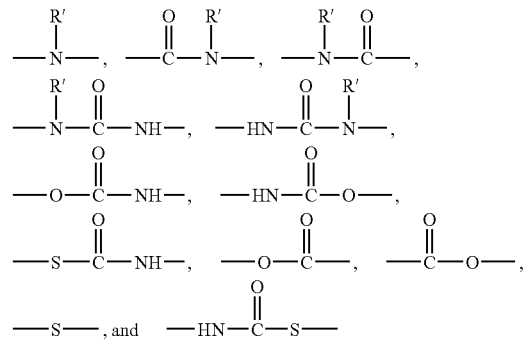

in which R' is H or $C_1$-$C_8$ alkyl, E is an alkyl diradical, a cycloalkyl diradical, an alkylcycloalkyl diradical, an alkylaryl diradical, or an aryl diradical with 1 to 40 carbon atoms which may have ether, thio, or amine linkages in the main chain, $D_1$, $D_2$ and $D_3$ independently of each other is a divalent radical selected from the group consisting of —($CH_2CH_2$O)$_t$—$CH_2CH_2$— in which t is an integer of 3 to 40, —$CF_2$—($OCF_2$)$_a$—($OCF_2CF_2$)$_b$—$OCF_2$— in which a and b independent of each other is an integer of 0 to 10 provided that a+b is a number in the range of 10 to 30, and a divalent segment of formula (3)

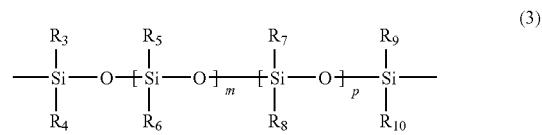

in which $R_3$, $R_4$, $R_5$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), -alk-($OCH_2CH_2$)$_n$—$OR_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700, provided that at least one of $D_1$, $D_2$ and $D_3$ is represented by formula (3); and
  Q is an organic radical containing an ethylenically unsaturated group.

Preferably, Q is an ethylenically unsaturated group of formula (4)

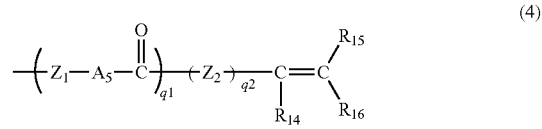

in which $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —(CH$_2$CH$_2$O)$_d$—CH$_2$CH$_2$— in which d is an integer of 1 to 10, unsubstituted phenylene divalent radical, C$_1$-C$_4$ alkyl or C$_1$-C$_4$ alkoxy substituted phenylene divalent radical or C$_7$-C$_{12}$ arakylene divalent radical; A$_5$ is —O— or

in which R' is H or C$_1$-C$_8$ alkyl; q$_1$ and q$_2$ independent of each other are an integer of 0 or 1; R$_{14}$ is hydrogen, C$_1$-C$_4$ alkyl or halogen; R$_{15}$ and R$_{16}$ independent of each other are hydrogen, C$_1$-C$_4$ alkyl, phenyl, carboxy or halogen.

A polysiloxane crosslinker of formula (1) can be prepared according to any known procedures, for example, those described in U.S. Pat. Nos. 4,136,250, 4,486,577, 4,605,712, 5,034,461, 5,416,132, and 5,760,100, herein incorporated by reference in their entireties.

In accordance with the invention, one of the functions of a polysiloxane crosslinker in the reactive mixture is to introduce ethylenically unsaturated groups. It is understood that any crosslinkers (i.e., having two or more ethylenically unsaturated groups) other than polysiloxane crosslinkers listed above can also be used in the invention.

Nearly any hydrophilic vinylic monomer can be used in the invention. Suitable hydrophilic vinylic monomers are, without this being an exhaustive list, hydrophilic amide-type vinylic monomers, hydroxyl-substituted lower alkyl (C$_1$ to C$_6$) (meth)acrylates, hydroxyl-substituted lower alkyl vinyl ethers, N-vinylpyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino(lower alkyl)- (where the term "amino" also includes quaternary ammonium), mono (lower alkylamino)(lower alkyl) and di(lower alkylamino) (lower alkyl)(meth)acrylates, allyl alcohol, N-vinyl alkylamide, N-vinyl-N-alkylamide, and the like.

Examples of preferred hydrophilic amide-type vinylic monomers include without limitation 2-acrylamidoglycolic acid, 2-acrylamido-2-methyl-1-propanesulfonic acid, 2-acrylamido-2-methyl-1-propanesulfonic acid or salt thereof, (3-acrylamidopropyl)-trimethylammonium chloride, 3-acryloylamino-1-propanol, N-(butoxymethyl)acrylamide, N-tert-butylacrylamide, diacetone acrylamide, N,N-dimethylacrylamide, N-[3-(dimethylamino)propyl]-methacrylamide, N-hydroxyethyl acrylamide, N-(hydroxymethyl)acrylamide, N-(isobutoxymethyl)acrylamide, N-isopropylacrylamide, N-isopropylmethacrylamide, methacrylamide, N-phenylacrylamide, N-[Tris(hydroxymethyl)methyl]acrylamide, N-methyl-3-methylene-2-pyrrolidone, and mixtures thereof.

Among the more preferred hydrophilic vinylic monomers are N,N-dimethylacrylamide (DMA), N,N-dimethylmethacrylamide (DMMA), 2-acrylamidoglycolic acid monohydrate, 3-acryloylamino-1-propanol, N-hydroxyethyl acrylamide, N-[tris(hydroxymethyl)methyl]-acrylamide, N-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, acrylic acid, a C$_1$-C$_4$-alkoxy polyethylene glycol(meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

Any RAFT agents can be used in the invention. RAFT agents can be classified into the following classes: dithiobenzoates, trithiocarbonates, xanthates, and dithiocarbamates. Examples of preferred RAFT agents include without limitation 4-Cyano-4-(dodecyl-sulfanylthiocarbonyl)sulfanylpentanoic acid, S-Cyanomethyl-5-dodecyltrithiocarbonate, S-(2-Cyano-2-propyl)-S-dodecyltrithiocarbonate, 3-benzylsulfanylthiocarbonylsulfanyl-propionic acid, cumyl dithiobenzoate, 2-cyanoprop-2-yl dithiobenzoate (i.e., cyanoisopropyl dithiobenzoate), 4-thiobenzoylsulfanyl-4-cyanopentanoic acid (TCA), S,S'-bis(α,α'-dimethyl-α"-acetic acid)-trithiocarbonate (BATC), and mixtures thereof.

In accordance with the invention, a free-radical initiator is a peroxide initiator or an azo initiator. A person skilled in the art understands well these two class of initiators. Peroxide initiators can be any kinds of organic peroxides, such as, for example, peroxyesters, peroxy(di)carbonates, diacyl peroxides, dialkyl peroxides, peroxyketals, and hydroperoxides. Peroxide initiators are available from commercial sources, such as, Akzo Nobel Polymer Chemicals. Examples of preferred azo initiators (i.e., containing a >N═N< bond) include without limitation 2,2'-azobis(2,4-dimethylpentanenitrile), 2,2'-azobis(2-methylpropanenitrile), 2,2'-azobis(2-methylbutanenitrile), 2,2'-azobisisobutyronitrile (AIBN), 2,2'-azo-bis(2,4-dimethylvaleronitrile) (VAZO-52), and the like.

In accordance with the invention, the reactive mixture can further comprise a siloxane-containing vinylic monomer, preferably, a siloxane-containing vinylic monomer of formula (5)

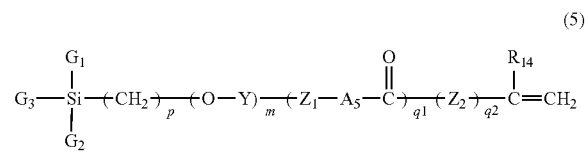

(5)

in which: R$_{14}$ is H or CH$_3$; Z$_1$ and Z$_2$ independent of each other are a linear or branched C$_1$-C$_{12}$ alkylene divalent radical, a linear or branched C$_1$-C$_{12}$ alkylene divalent radical having one or more hydroxyl groups, a radical of —(CH$_2$CH$_2$O)$_d$—CH$_2$CH$_2$ in which d is an integer of 1 to 10, unsubstituted phenylene divalent radical, C$_1$-C$_4$ alkyl or C$_1$-C$_4$ alkoxy substituted phenylene divalent radical or C$_7$-C$_{12}$ arakylene divalent radical; A$_5$ is —O— or

in which R' is H or C$_1$-C$_8$ alkyl; q$_1$ and q$_2$ independent of each other are an integer of 0 or 1; Y is a C$_1$-C$_6$ alkylene divalent radical or a C$_1$-C$_6$ alkylene divalent radical containing one or more hydroxyl groups, m is an integer of 0 to 5, p is an integer of 1 to 6, and G$_1$, G$_2$ and G$_3$ independent of each other are C$_1$-C$_6$ alkyl, phenyl, benzyl, or a radical of formula (6)

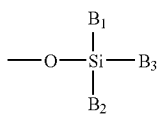

(6)

in which $B_1$, $B_2$ and $B_3$ independent of each other are $C_1$-$C_6$ alkyl, phenyl, or benzyl; provided that at least two of $G_1$, $G_2$ and $G_3$ are radicals of formula (6).

Examples of siloxane-containing vinylic monomers of formula (5) include without limitation N-[tris(trimethylsiloxy) silylpropyl](meth)acrylamide, N-[tris(dimethylpropylsiloxy)-silylpropyl] (meth)acrylamide, N-[tris (dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)-methylsilyl)propyloxy)propyl)-2-methyl acrylamide; N-(2-hydroxy-3-(3-(bis(trimethylsilyloxy)-methylsilyl)propyloxy)propyl)acrylamide; N,N-bis[2-hydroxy-3-(3-(bis(trimethylsilyloxy)-methylsilyl)propyloxy)propyl]-2-methyl acrylamide; N,N-bis[2-hydroxy-3-(3-(bis(trimethylsilyloxy)methylsilyl) propyloxy)propyl]acrylamide; N-(2-hydroxy-3-(3-(tris (trimethylsilyloxy)silyl)propyloxy)propyl)-2-methyl acrylamide; N-(2-hydroxy-3-(3-(tris(trimethylsilyloxy)silyl) propyloxy)propyl)acrylamide; N,N-bis[2-hydroxy-3-(3-(tris (trimethylsilyloxy)silyl)propyloxy)propyl]-2-methyl acrylamide; N,N-bis[2-hydroxy-3-(3-(tris(trimethylsilyloxy)silyl) propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl) propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyl-tris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth) acrylamide monomers of formula (1) are N-[tris(trimethylsiloxy)silylpropyl]acrylamide, TRIS, N-[2-hydroxy-3-(3-(t-butyldimethylsilyl)propyloxy)propyl]acrylamide.

In accordance with the invention, the reactive mixture can further comprise a monoethylenically functionalized polysiloxane vinylic monomer or macromer of formula (7)

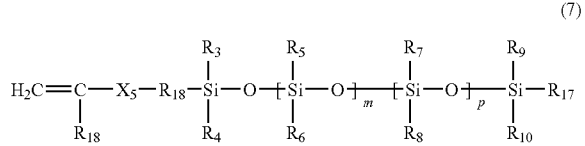

(7)

in which $X_5$ denotes —COO—, —CONR$_{19}$—, —OCOO—, or —OCONR$_{19}$—, where each $R_{19}$ is independently H or $C_1$-$C_7$ alkyl; $R_{18}$ denotes a divalent $C_1$-$C_{25}$ alkyl or $C_6$-$C_{30}$ aryl radical, which may interrupted by —O—, —COO—, —CONR$_{14}$—OCOO— or —OCONR$_{19}$— and may comprise hydroxy group, primary, secondary, or tertiary amine group, carboxy group, or carboxylic acid; $R_{17}$ is a monovalent $C_1$-$C_{25}$ alkyl or $C_6$-$C_{30}$ aryl radical, which may interrupted by —O—, —COO—, —CONR$_{19}$—, —OCOO— or —OCONR$_{19}$— and may comprise hydroxy group, primary, secondary, or tertiary amine group, carboxy group, or carboxylic acid; $R_3$, $R_4$, $R_5$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), -alk-(OCH$_2$CH$_2$)$_n$—OR$_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700. Preferred examples of such monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy) propyl terminated, mono-butyl terminated polydimethylsiloxane). Alternatively, monoethylenically functionalized polysiloxanes can be obtained by ethylenically functionalizing of a monofunctionalized polysiloxanes (i.e., with one sole terminal functional group, such as, e.g., —NH$_2$, —OH, —COOH, epoxy group, etc.) with a vinylic monomer having a functional group coreactive with the terminal functional group of the monofunctionalized polysiloxane in a coupling reaction known to a person skilled in the art. Suitable monofunctionalized polysiloxanes are commercially available, e.g., from Aldrich, ABCR GmbH & Co., Fluorochem, or Gelest, Inc, Morrisville, Pa.

In accordance with the invention, the reactive mixture can further comprise one or more members selected from the group consisting of a crosslinking agent (i.e., a compound comprising two or more ethylenically unsaturated groups), a hydrophobic vinylic monomer, a hydrophilic prepolymer having two or more ethylenically unsaturated groups, a polymerizable UV absorber (i.e., a compound comprising a UV absorbing moiety and an ethylenically unsaturated group).

Examples of preferred crosslinking agents include without limitation tetra(ethyleneglycol) di-(meth)acrylate, tri(ethyleneglycol)di-(meth)acrylate, ethyleneglycol di-(meth)acylate, di(ethyleneglycol)di-(meth)acrylate, trimethylopropane trimethacrylate, pentaerythritol tetramethacrylate, bisphenol A dimethacrylate, vinyl methacrylate, ethylenediamine dimethyacrylamide, glycerol dimethacrylate, triallyl isocyanurate, triallyl cyanurate, allylmethacrylate, dimers (e.g., 1,3-bis(methacrylamidopropyl)-1,1,3,3-tetrakis (trimethylsiloxy)-disiloxane, 1,3-bis(N-methacrylamidopropyl)-1,1,3,3-tetrakis-(trimethylsiloxy) disiloxane, 1,3-bis(methacrylamidobutyl)-1,1,3,3-tetrakis (trimethylsiloxy)-disiloxane, 1,3-bis(acrylamidopropyl)-1,1,3,3-tetrakis(trimethylsiloxy)disiloxane, 1,3-bis (methacryloxyethylureidopropyl)-1,1,3,3-tetrakis (trimethylsiloxy)disiloxane) disclosed in U.S. Pat. No. 4,711, 943 (herein incorporated by reference in its entirety), and combinations thereof. A preferred cross-linking agent is tetra (ethyleneglycol)diacrylate, tri(ethyleneglycol)diacrylate, ethyleneglycol diacylate, di(ethyleneglycol)diacrylate, triallyl isocyanurate, or triallyl cyanurate.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred hydrophilic prepolymers with multiple acryloyl or methacryloyl groups include, but are not limited to, poly(ethylene glycol)di-(meth)acrylates, poly(ethylene glycol)di-(meth)acrylamides, a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Patent Application Publication No. 2004/0082680; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. No. 6,479,587 and in U.S. Published Application No. 2005/0113549; crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; polyalkylene glycol-tetra(meth)acrylate prepolymers disclosed in EP 961,941 and U.S. Pat. No. 6,221,303; and crosslinkable polyallylamine gluconolactone prepolymers disclosed in International Application No. WO 2000/31150 and U.S. Pat. No. 6,472,489.

Examples of preferred polymerizable UV absorbers include without limitation 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone.

RAFT polymerization of a reactive mixture for making a prepolymer of the invention can be carried out in any manner as known to a person skilled in the art. The temperature of RAFT polymerization is preferably from 45° C. to 150° C., more preferably from 55° C. to 125° C.

In a preferred embodiment, the molar ratio of the RAFT agent to the polysiloxane crosslinker is less than about 0.2, more preferably from about 0.005 to about 0.1.

In a preferred embodiment, the reactive mixture for RAFT polymerization comprises: (1) from about 5% to about 60% by weight, preferably from about 10% to about 50% by weight, even more preferably from about 15% to about 55% by weight, even more preferably from about 20% to about 45% by weight, of one or more hydrophilic vinylic monomers; (2) from about 5% to about 75% by weight, preferably from about 10% to about 70% by weight, more preferably from about 15% to about 65% by weight, of a polysiloxane crosslinker; and (3) from zero to about 50%, more preferably from about 5% to about 45%, even more preferably from about 10% to about 40% by weight, of a siloxane-containing vinylic monomer of formula (5) (as described above) or monoethylenically functionalized polysiloxane vinylic monomer or macromer of formula (7) (as described above). The foregoing range combinations are presented with the proviso that the listed components and any additional polymerizable components (i.e., those including one or more ethylenically unsaturated groups) add up to 100% by weight.

A reactive mixture preferably comprises a solvent which dissolves all of the desirable components. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

Resultant prepolymers of the invention comprise active RAFT groups

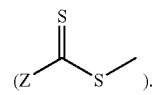

Those active RAFT groups in the prepolymers of the invention can undergo further polymerization during crosslinking of the prepolymers for making a silicone hydrogel material or be removed according to a method known to a person skilled in the art, for example, aminolysis, reduction, or thermal elimination. For example, the removal of the dithiobenzoate end group from prepolymers can be achieved by using a nucleophile, e.g., ethylene diamine, (e.g., heating the prepolymers with ethylene diamine in a solvent for a period of time at a temperature, e.g., at 40° C.), thereby converting the dithiobenzoate end group to a thiol group (—SH). It is preferably that the active RAFT groups are removed from the resultant prepolymers.

Preferably, resultant prepolymers of the invention is substantially purified in a manner known to a person skilled in the art, for example, by precipitation with organic solvents, such as acetone, filtration and washing, extraction in a suitable solvent, dialysis or ultrafiltration, ultra-filtration being especially preferred. The prepolymers is preferably purified to be in an extremely pure form, for example in the form of concentrated solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known to a person skilled in the art. It is possible for the ultrafiltration to be carried out repeatedly, for example from two to ten times. Alternatively, the ultrafiltration can be carried out continuously until the selected degree of purity is attained. The selected degree of purity can in principle be as high as desired. By using such prepolymers in making contact lenses, the obtained lenses will not require subsequent purification such as, for example, costly and complicated extraction of unpolymerized matrix-forming material.

In another aspect, the invention provides a soft contact lens. The soft contact lens of the invention comprises: a silicone hydrogel material that is obtained by curing a lens-forming material in a mold, wherein the lens-forming material comprises an actinically crosslinkable prepolymer which is a RAFT polymerization product of a reactive mixture comprising a polysiloxane crosslinker with two terminal vinyl-groups, a hydrophilic vinylic monomer, a RAFT agent, and a free-radical initiator, wherein the prepolymer comprises: (1) polysiloxane crosslinking units derived from the polysiloxane crosslinker both the two terminal vinyl-groups of which undergo the RAFT polymerization; (2) hydrophilic units derived from a hydrophilic vinylic monomer; (3) dangling polysiloxane chains with one terminal vinyl group, wherein the dangling polysiloxane chains are derived from the polysiloxane crosslinker one of the two terminal vinyl-groups of which undergoes the RAFT polymerization while the other remains unreacted.

In accordance with the invention, a lens-forming material is a fluid composition, which can be a solution or a melt at a temperature from about 20° C. to about 85° C. Preferably, a lens-forming material is a solution of at least one prepolymer of the invention and other desirable components in water, or an organic solvent, or a mixture of water and one or more organic solvents.

A solution of at least one prepolymer can be prepared by dissolving the prepolymer and other components in any suitable solvent known to a person skilled in the art. Examples of suitable solvents are described above.

All of the various embodiments of the prepolymer of the invention described above can be used in this aspect of the invention.

The lens-forming material can optionally but preferably does not comprise one or more vinylic monomer and/or one or more crosslinking agents (i.e., compounds with two or more ethylenically unsaturated groups and with molecular weight less than 700 Daltons). However, the amount of those components should be low such that the final ophthalmic device does not contain unacceptable levels of unpolymerized monomers and/or crosslinking agents. The presence of unacceptable levels of unpolymerized monomers and/or crosslinking agents will require extraction to remove them, which requires additional steps that are costly and inefficient.

But preferably, the lens-forming material is substantially free of vinylic monomer and crosslinking agent (i.e., preferably about 2% or less, more preferably about 1% or less, even more preferably about 0.5% or less by weight of combination of vinylic monomer and crosslinking agent).

It must be understood that a lens-forming material can also comprise various components, such as, for example, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles), bioactive agent, leachable lubricants, fillers, and the like, as known to a person skilled in the art.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups).

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The number-average molecular weight $M_n$ of the non-crosslinkable hydrophilic polymer is preferably from 5,000 to 500,000, more preferably from 10,000 to 300,000, even more preferably from 20,000 to 100,000.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711 to Schad; 4,460,534 to Boehm et at; 5,843,346 to Morrill; and 5,894,002 to Boneberger et al., which are also incorporated herein by reference.

Virtually all materials known in the art for making molds can be used to make molds for preparing ocular lenses. For example, polymeric materials, such as polyethylene, polypropylene, polystyrene, PMMA, a cyclic olefin copolymer (such as for example, Topas®COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, or the like can be used. Other materials that allow UV light transmission could be used, such as, quartz, glass, sapphire, $CaF_2$.

In a preferred embodiment, when the polymerizable components in the lens-forming material is composed essentially of prepolymers, reusable molds can be used. Examples of reusable molds suitable for spatial limitation of radiation include without limitation those disclosed in U.S. Pat. Nos. 6,800,225, 6,627,124, 7,384,590, and 7,387,759, which are incorporated by reference in their entireties. In this aspect, the lens-forming material is poured into a mold consisting of two mold halves not touching each other but having a thin gap of annular design arranged between them. The gap is connected to the mold cavity, so that excess lens-forming material can flow into the gap. Instead of polypropylene molds that can be used only once, it is possible for reusable quartz, glass, sapphire or $CaF_2$ molds to be used, since, following the production of a lens, these molds can be cleaned rapidly and effectively to remove unreacted materials and other residues, using water or a suitable solvent, and can be dried with air. Reusable molds can also be made of a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced and high fidelity to the lens design.

In accordance with the invention, the lens-forming material can be introduced (dispensed) into a cavity formed by a mold according to any known methods.

After the lens-forming material is dispensed into the mold, it is polymerized to produce a contact lens. Crosslinking may be initiated in the mold e.g. by means of actinic radiation, such as UV irradiation, ionizing radiation (e.g., gamma or X-ray irradiation). Where prepolymers of the invention are the polymerizable components in the lens-forming material, the mold containing the lens-forming material can be exposed to a spatial limitation of actinic radiation to crosslink the prepolymers.

The crosslinking according to the invention may be effected in a very short time, e.g. in minutes, advantageously in 3 minutes, preferably in 2 minutes, more preferably in 1 minute, most preferably in 5 to 50 seconds.

Opening of the mold so that the molded article can be removed from the mold may take place in a manner known per se.

The molded contact lenses can further subject to further processes, such as, for example, lens extraction with an organic solvent (e.g., those described above for preparing a lens forming material), hydration (in a water or an aqueous solution of a wetting agent), surface treatment, packaging in lens packages with a packaging solution which can contain a wetting agent (e.g., a hydrophilic polymer described above) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization (e.g., autoclave); and the like.

A contact lens of the invention has an oxygen permeability of preferably at least about 40 barrers, more preferably at least about 60 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has an elastic modulus of about 2.0 MPa or less, preferably about 1.5 MPa or less, more preferably about 1.2 or less, even more preferably from about 0.4 MPa to about 1.0 MPa.

A contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 55%, more preferably from about 20% to about 38% by weight when fully hydrated. The water content of a silicone hydrogel contact lens can be measured according to Bulk Technique as disclosed in U.S. Pat. No. 5,849,811.

In a further aspect, the invention provides a method for producing soft contact lenses. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises an actinically crosslinkable prepolymer which is a RAFT polymerization product of a reactive mixture comprising a polysiloxane crosslinker with two terminal vinyl-groups, a hydrophilic vinylic monomer, a RAFT agent, and a free-radical initiator, wherein the prepolymer comprises: (1) polysiloxane crosslinking units derived from the polysiloxane crosslinker both the two terminal vinyl-groups of which undergo the RAFT polymerization; (2) hydrophilic units derived from a hydrophilic vinylic monomer; (3) dangling polysiloxane chains with one terminal vinyl group, wherein the dangling polysiloxane chains are derived from the polysiloxane crosslinker one of the two terminal vinyl-groups of which undergoes the RAFT polymerization while the other remains unreacted; and actinically irradiating the lens forming material in the cavity to form a contact lens.

All of the various embodiments of the molds, reactive mixture, and spatial limitation of radiation, and contact lens of the invention described above can be used in this aspect of the invention.

The invention also provides a method for preparing an actinically-crosslinkable prepolymer of the invention. The method comprises obtaining a reactive mixture comprising a polysiloxane crosslinker with two terminal vinyl-groups, a hydrophilic vinylic monomer, a RAFT agent, and a free-radical initiator, wherein the molar ratio of the RAFT agent to the polysiloxane crosslinker is less than about 0.2; and initiating RAFT polymerization of the mixture to obtain an actinically crosslinkable prepolymer comprising (a) polysiloxane crosslinking units derived from the polysiloxane crosslinker both the two terminal vinyl-groups of which undergo the RAFT polymerization, (b) hydrophilic units derived from a hydrophilic vinylic monomer, and (c) dangling polysiloxane chains with one terminal vinyl group, wherein the dangling polysiloxane chains are derived from the polysiloxane crosslinker one of the two terminal vinyl-groups of which undergoes the RAFT polymerization while the other remains unreacted.

All of the various embodiments of the reactive mixture described above can be used in this aspect of the invention.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

Oxygen permeability measurements. The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters O$_2$/cm$^2$-minute]
$P_{oxygen} = (P_{measured} - P_{water}$ vapor)=(% O$_2$ in air stream) [mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
where $Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients (D/D$_{ref}$) in reference to a lens material, Alsacon, as reference material. Alsacon has an ionoflux diffusion coefficient of $0.314 \times 10^{-3}$ mm$^2$/minute.

Water Contact Angle (WCA) Measurements. Water contact angle (WCA) measurements are performed by the sessile drop method with a DSA 10 drop shape analysis system from Kruss GmbH, Germany with pure water (Fluka, surface tension 72.5 mN/m at 20° C.). For measurement purposes a contact lens is taken off the storage solution with tweezers and excess storage solution is removed by gentle shaking. The contact lens are placed on the male part of a lens mold and gently blotted with a dry and clean cloth. A water droplet (approximately 1 µl) is then dosed on the lens apex, and the change of the contact angle over time of this water droplet (WCA(t), circle fitting mode) is monitored. The WCA is calculated by the extrapolation of the graph WCA(t) to t=0.

EXAMPLE 2

General Scheme for Preparation of Prepolymers

The following scheme illustrates how to prepare a prepolymer of the invention.

sisobutyronitrile (AIBN from Fluke, recrystalised) (0.026 g, 0.16 mmol,) and 4-thiobenzoylsulfanyl-4-cyanopentanoic acid (TCA from SyMO-Chem) (0.065 g, 0.23 mmol) as well as N,N-dimethylacrylamide (DMA from Bimax) (12.5 g, 126 mmol) and hydroxyethylacrylate (HEA from Aldrich) (12.5 g, 108 mmol) are added to the reaction flask under nitrogen flow. The mixture is cooled with an ethanol-bath, then degassed 4 times for 4 minutes at $5 \times 10^{-2}$ mbar and allowed to warm up to ambient temperature. The reaction mixture is heated at 68° C. for 18 hours, during that time monitoring samples are withdrawn from the reaction flask. The reaction solvent is then exchanged against water, obtained copolymer is purified by means of diafiltration (membrane cut-off 10K, Millipore) and freeze-dried (73% yield).

Monomers conversion is determined by gas chromatography (GC). Molecular weights are measured by gel permeation chromatography (GPC) in THF and polystyrene (PSS) standards. Copolymer composition is determined by means of nuclear magnetic spectroscopy ($^1$H NMR). Analytical results are summarised in Table 1.

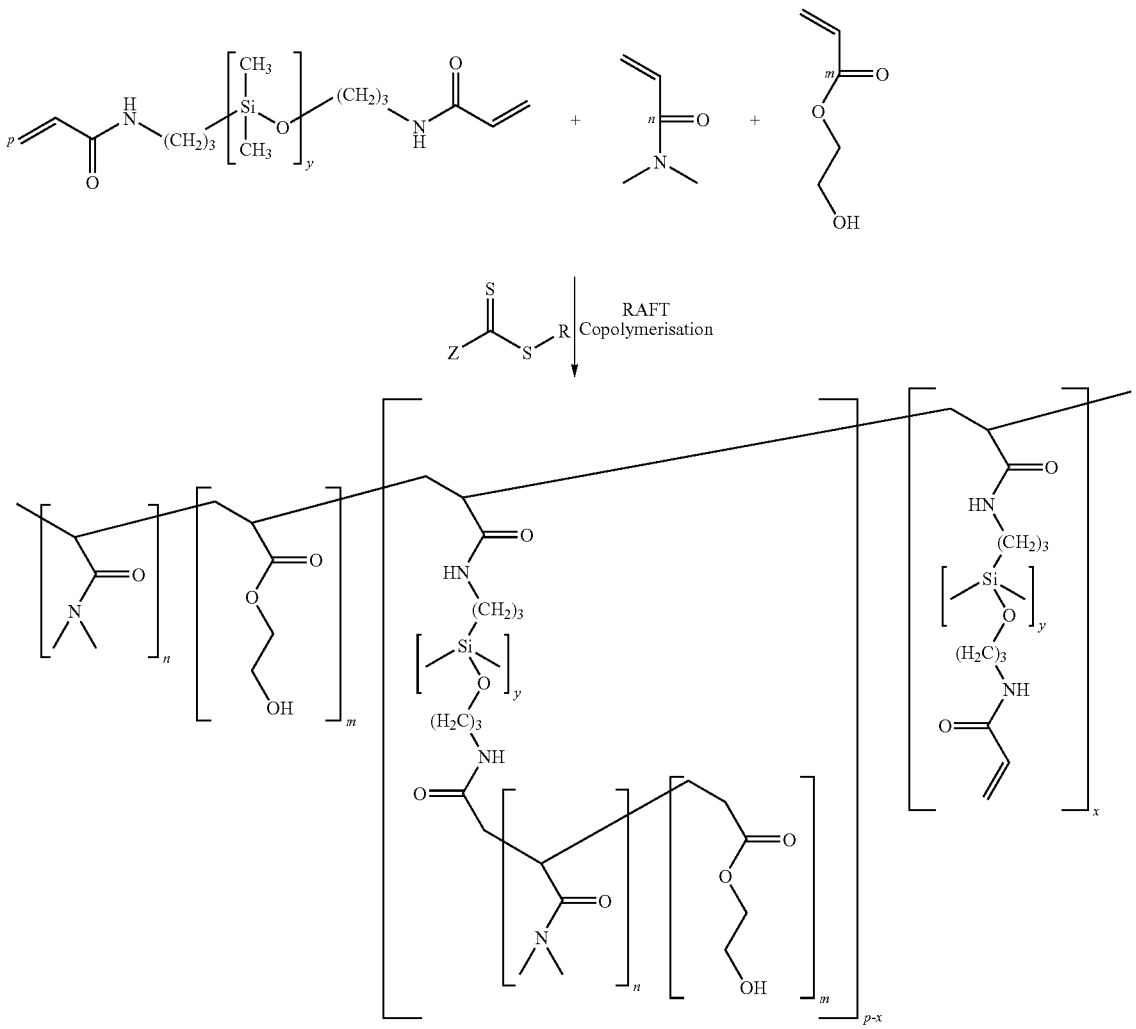

EXAMPLE 3

Copolymer Synthesis

Polydimethylsiloxane-diacrylamide (PDMS-DAm MW 11.5K from Shin-Etsu) (37.5 g, 3.3 mmol) and n-propanol (252 g, AppliChem) are added to a 500 mL round bottom flask equipped with magnetic stirrer and nitrogen inlet. 2,2'-azobi- Lens Fabrication:

Copolymer OS10 is formulated in n-propanol at 60% solid content together with a photoinitiator Irgacure 2959 (2.5% relative to copolymer). The formulation is characterised by photorheology (Table 1) and lenses are fabricated in double-sided molds applying 18 s UV irradiation time and 4 mW/cm³ UV intensity.

EXAMPLE 4

Copolymer Synthesis

PDMS-DAm MW 4.5K (18.75 g, 4 mmol, Shin-Etsu), PDMS-DAm MW 33K (18.75 g, 0.55 mmol, Gelest) and n-propanol (252.5 g, AppliChem) are added to a 500 mL round bottom flask equipped with magnetic stirrer and nitrogen inlet. AIBN (0.026 g, 0.16 mmol, Fluke, recrystalised) and TCA (0.065 g, 0.23 mmol, SyMO-Chem) as well as DMA (12.5 g, 126 mmol, Bimax) and HEA (12.5 g, 108 mmol, Aldrich) are added to the reaction mixture in the nitrogen flow. The mixture is cooled with an ice-bath, then degassed 10 times for 5 min at 8 mbar and allowed to warm up to ambient temperature. The reaction mixture is heated at 68° C. for 18 hours, during that time monitoring samples are withdrawn from the reaction flask. The reaction solvent is then exchanged against water, obtained copolymer is purified by means of diafiltration (membrane cut-off 10K, Millipore) and freeze-dried (75% yield).

Monomers conversion is determined by gas chromatography (GC). Molecular weights are measured by gel permeation chromatography (GPC) in THF and polystyrene (PSS) standards. Copolymer composition is determined by means of nuclear magnetic spectroscopy ($^1$H NMR). Analytical results are summarised in Table 1.

Lens Fabrication:

Copolymer DOE7 is formulated in n-propanol at 65% solid content together with a photoinitiator Irgacure 2959 (2.5% relative to copolymer). The formulation is characterised by photorheology (Table 1) and lenses are fabricated in double-sided moulds applying 20 s UV irradiation time and 4 mW/cm³ UV intensity.

TABLE 1

| Copolymer | Label: | ex. 3 | ex. 4 |
|---|---|---|---|
| Synthesis | Reaction temperature [° C.] | 68 | 68 |
| | DMA/HEA/PDMS [wt %] | 20/20/60 | 20/20/60 |
| | PDMS-DAm MW | 11.500 | 4.500/33.000 |
| | Duration [h] | 18 | 18 |
| GC | DMA Conversion [%] | 61 | 56 |
| | HEA Conversion [%] | 65 | 63 |
| GPC (THF) | Mw (UV) | 51,000 | 28,500 |
| | Mn (UV) | 17,800 | 7,800 |
| | PDI (UV) | 2.87 | 3.65 |
| $^1$H NMR | Copolymer PDMS (C=C) [meq/g] | 0.068 | 0.096 |
| | PDMS (C=C) Conversion [%] | 44 | 51 |
| | wt. % DMA | 13 | 11 |
| | wt. % HEA | 14 | 14 |
| | wt. % PDMS | 74 | 75 |
| Formulation | Label | NMU | JDE |
| | Solvent | 1-Propanol | 1-Propanol |
| | Solid Content [%] | 60 | 65 |
| | Initiator [%] | 0.25 | 0.25 |
| Photorheology | Curing Time [s] | 12 | 14 |
| | UV intensity [mW/cm²] | 4 | 4 |
| | G' [kPa] | 56 | 79 |
| | Viscosity [mPas] | 6,200 | 4,592 |
| Lens | Water content [%] | 29 | n.d. |
| | Extractables (MeOH) [%] | 4.5 | n.d. |
| | Extractables (i-PrOH) [%] | 7.7 | n.d. |

What is claimed is:

1. An actinically crosslinkable prepolymer, which is a RAFT polymerization product of a reactive mixture comprising a polysiloxane crosslinker with two terminal vinyl-groups, a hydrophilic vinylic monomer, a RAFT agent, and a free-radical initiator, wherein the prepolymer comprises: (1) polysiloxane crosslinking units derived from the polysiloxane crosslinker both the two terminal vinyl-groups of which undergo the RAFT polymerization; (2) hydrophilic units derived from a hydrophilic vinylic monomer; (3) dangling polysiloxane chains each with one terminal vinyl group, wherein the dangling polysiloxane chains are derived from the polysiloxane crosslinker one of the two terminal vinyl-groups of which undergoes the RAFT polymerization while the other remains unreacted, wherein the molar ratio of the RAFT agent to the polysiloxane crosslinker in the reactive mixture is from about 0.005 to about 0.1, wherein the prepolymer is capable of being actinically crosslinked, in the absence of one or more vinylic monomers, to form a silicone hydrogel material.

2. The prepolymer of claim 1, wherein the free-radical initiator is a peroxide initiator or an azo initiator.

3. The prepolymer of claim 1, wherein the RAFT agent is selected from the group consisting of 4-Cyano-4-(dodecyl-sulfanylthiocarbonyl)sulfanylpentanoic acid, S-Cyanomethyl-5-dodecyltrithiocarbonate, S-(2-Cyano-2-propyl)-S-dodecyltrithiocarbonate, 3-benzylsulfanylthiocarbonylsulfanyl-propionic acid, cumyl dithiobenzoate, 2-cyanoprop-2-yl dithiobenzoate (i.e., cyanoisopropyl dithiobenzoate), 4-thiobenzoylsulfanyl-4-cyanopentanoic acid (TCA), S,S'-bis(α,α'-dimethyl-α"-acetic acid)-trithiocarbonate (BATC), and mixtures thereof.

4. The prepolymer of claim 1, wherein the hydrophilic vinylic monomer is selected from the group consisting of N,N-dimethylacrylamide, N,N-dimethylmethacrylamide, 2-acrylamidoglycolic acid monohydrate, 3-acryloylamino-1-propanol, N-hydroxyethyl acrylamide, N-[tris(hydroxymethyl)methyl]-acrylamide, N-methyl-3-methylene-2-pyrrolidone, 2-hydroxyethylmethacrylate, 2-hydroxyethyl acrylate, hydroxypropyl acrylate, hydroxypropyl methacrylate, trimethylammonium 2-hydroxy propylmethacrylate hydrochloride, aminopropyl methacrylate hydrochloride, dimethylaminoethyl methacrylate, glycerol methacrylate, N-vinyl-2-pyrrolidone, allyl alcohol, vinylpyridine, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

5. The prepolymer of claim 1, wherein the polysiloxane crosslinker is represented by formula (1)

$$Q-X_1-A_1-PDMS-A_2-X_2-Q \quad (1)$$

in which $A_1$ and $A_2$ independent of each other is a linear or branched $C_1$-$C_{10}$ alkyl diradical which optionally comprises one or more hydroxyl or amino groups;

$X_1$ and $X_2$ independent of each other are a linkage selected from the group consisting of a direct bond,

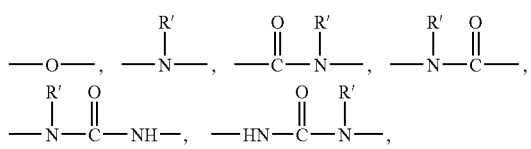

-continued

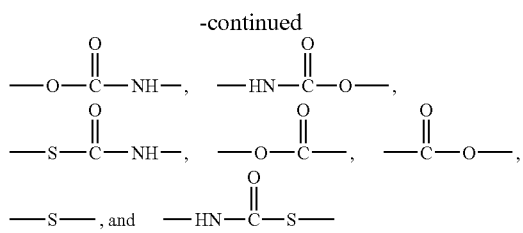

in which R' is H or $C_1$-$C_8$ alkyl;
PDMS is a polysiloxane divalent radical of formula (2)

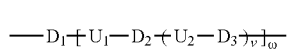

in which v is 0 or 1, ω is an integer of from 0 to 5, $U_1$ and $U_2$ independent of each other represent a divalent radical of —$R'_1$—$X_3$-E—$X_4$—$R'_2$— in which $R'_1$ and $R'_2$ independent of each other is a linear or branched $C_1$-$C_{10}$ alkylene divalent radical, $X_4$ and $X_5$ independent of each other are a linkage selected from the group consisting of —O—,

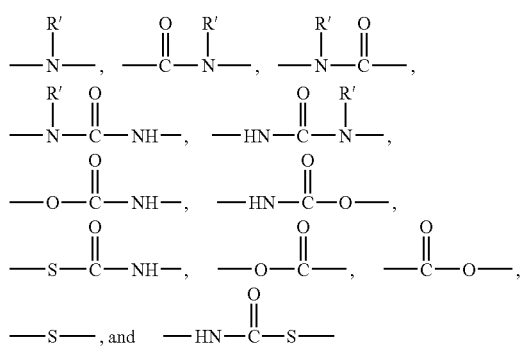

in which R' is H or $C_1$-$C_8$ alkyl, E is an alkyl diradical, a cycloalkyl diradical, an alkylcycloalkyl diradical, an alkylaryl diradical, or an aryl diradical with 1 to 40 carbon atoms which may have ether, thio, or amine linkages in the main chain, $D_1$, $D_2$ and $D_3$ independently of each other is a divalent radical selected from the group consisting of —($CH_2CH_2O$)$_t$—$CH_2CH_2$— in which t is an integer of 3 to 40, —$CF_2$—($OCF_2$)$_a$—($OCF_2CF_2$)$_b$—$OCF_2$— in which a and b independent of each other is an integer of 0 to 10 provided that a+b is a number in the range of 10 to 30, and a divalent segment of formula (3)

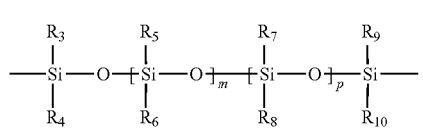

in which $R_3$, $R_4$, $R_5$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), -alk-($OCH_2CH_2$)$_n$—$OR_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700, provided that at least one of $D_1$, $D_2$ and $D_3$ is represented by formula (3); and
Q is an ethylenically unsaturated group of formula (4)

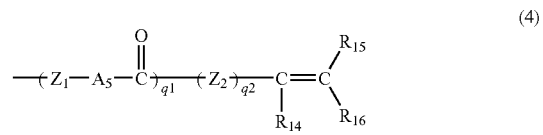

in which $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —($CH_2CH_2O$)$_d$—$CH_2CH_2$— in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is —O— or

in which R' is H or $C_1$-$C_8$ alkyl; $q_1$ and $q_2$ independent of each other are an integer of 0 or 1; $R_{14}$ is hydrogen, $C_1$-$C_4$ alkyl or halogen; $R_{15}$ and $R_{16}$ independent of each other are hydrogen, $C_1$-$C_4$ alkyl, phenyl, carboxy or halogen.

6. The prepolymer of claim 1, wherein the reactive mixture can further comprises a siloxane-containing vinylic monomer of formula (5)

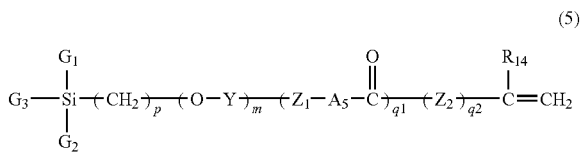

in which:
$R_{14}$ is H or $CH_3$;
$Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —($CH_2CH_2O$)$_d$—$CH_2CH_2$ in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is —O— or

in which R' is H or $C_1$-$C_8$ alkyl;
$q_1$ and $q_2$ independent of each other are an integer of 0 or 1;
Y is a $C_1$-$C_6$ alkylene divalent radical or a $C_1$-$C_6$ alkylene divalent radical containing one or more hydroxyl groups;
m is an integer of 0 to 5, p is an integer of 1 to 6; and $G_1$, $G_2$ and $G_3$ independent of each other are $C_1$-$C_6$ alkyl, phenyl, benzyl, or a radical of formula (6)

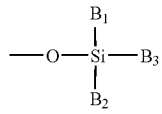

(6)

in which $B_1$, $B_2$ and $B_3$ independent of each other are $C_1$-$C_6$ alkyl, phenyl, or benzyl;

provided that at least two of $G_1$, $G_2$ and $G_3$ are radicals of formula (6).

7. The prepolymer of claim 6, wherein the siloxane-containing vinylic monomer is selected from the group consisting of N-[tris(trimethylsiloxy)silylpropyl]methacrylamide, N-[tris(trimethylsiloxy)-silylpropyl]acrylamide, N-[tris(dimethylpropylsiloxy)silylpropyl]acrylamide, N-[tris(dimethylpropylsiloxy)silylpropyl]methacrylamide, N-[tris(dimethylphenylsiloxy)silylpropyl]acrylamide, N-[tris(dimethylphenylsiloxy)silylpropyl]methacrylamide, N-[tris(dimethylethylsiloxy)silylpropyl]acrylamide, N-[tris(dimethylethylsiloxy)silylpropyl]methacrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyl-tris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate), and mixtures thereof.

8. The prepolymer of claim 1, wherein the reactive mixture can further comprises a monoethylenically functionalized polysiloxane vinylic monomer or macromer of formula (7)

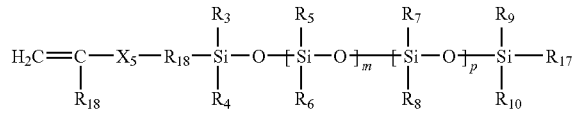

(7)

in which $X_5$ denotes —COO—, —CONR$_{19}$—, —OCOO—, or —OCONR$_{19}$—, where each $R_{19}$ is independently H or $C_1$-$C_7$ alkyl; $R_{18}$ denotes a divalent $C_1$-$C_{25}$ alkyl or $C_6$-$C_{30}$ aryl radical, which may interrupted by —O—, —COO—, —CONR$_{14}$—, —OCOO— or —OCONR$_{19}$— and may comprise hydroxy group, primary, secondary, or tertiary amine group, carboxy group, or carboxylic acid; $R_{17}$ is a monovalent $C_1$-$C_{25}$ alkyl or $C_6$-$C_{30}$ aryl radical, which may interrupted by —O—, —COO—, —CONR$_{19}$—, —OCOO— or —OCONR$_{19}$— and may comprise hydroxy group, primary, secondary, or tertiary amine group, carboxy group, or carboxylic acid; $R_3$, $R_4$, $R_5$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), -alk-(OCH$_2$CH$_2$)$_n$—OR$_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700.

9. The prepolymer of claim 1, wherein the reactive mixture comprises a polymerizable UV absorber.

10. The prepolymer of claim 9, wherein the polymerizable UV absorber is selected from the group consisting of 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butylphenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone, and mixture thereof.

11. The prepolymer of claim 1, wherein the reactive mixture comprises: (1) from about 5% to about 60% by weight of one or more hydrophilic vinylic monomers; (2) from about 5% to about 75% by weight of one or more polysiloxane crosslinkers; and (3) from zero to about 50% by weight of a siloxane-containing vinylic monomer and/or a monoethylenically functionalized polysiloxane vinylic monomer or macromer, provided that components (1) to (3) and any additional polymerizable components add up to 100% by weight.

12. A soft contact lens, comprising: a silicone hydrogel material that is obtained by curing a lens-forming material in a mold, wherein the lens-forming material comprises an actinically crosslinkable prepolymer which is a RAFT polymerization product of a reactive mixture comprising a polysiloxane crosslinker with two terminal vinyl-groups, a hydrophilic vinylic monomer, a RAFT agent, and a free-radical initiator, wherein the molar ratio of the RAFT agent to the polysiloxane crosslinker in the reactive mixture is from about 0.005 to about 0.1, wherein the prepolymer comprises: (1) polysiloxane crosslinking units derived from the polysiloxane crosslinker both the two terminal vinyl-groups of which undergo the RAFT polymerization; (2) hydrophilic units derived from a hydrophilic vinylic monomer; (3) dangling polysiloxane chains each with one terminal vinyl group, wherein the dangling polysiloxane chains are derived from the polysiloxane crosslinker one of the two terminal vinyl-groups of which undergoes the RAFT polymerization while the other remains unreacted, wherein the contact lens has at least one property selected from the group consisting of an oxygen permeability of at least about 40 barrers, an elastic modulus of about 1.5 MPa or less, an Ionoflux Diffusion Coefficient, D, of at least about $1.5 \times 10^{-6}$ mm$^2$/min, and a water content of from about 15% to about 70%.

13. The soft contact lens of claim 12, wherein the RAFT agent is selected from the group consisting of 4-Cyano-4-(dodecyl-sulfanylthiocarbonyl)sulfanylpentanoic acid, S-Cyanomethyl-5-dodecyltrithiocarbonate, S-(2-Cyano-2-propyl)-S-dodecyltrithiocarbonate, 3-benzylsulfanylthiocarbonylsulfanyl-propionic acid, cumyl dithiobenzoate, 2-cyanoprop-2-yl dithiobenzoate (i.e., cyanoisopropyl dithiobenzoate), 4-thiobenzoylsulfanyl-4-cyanopentanoic acid (TCA), S,S'-bis($\alpha,\alpha'$-dimethyl-$\alpha''$-acetic acid)-trithiocarbonate (BATC), and mixtures thereof.

14. The soft contact lens of claim 12, wherein the hydrophilic vinylic monomer is selected from the group consisting of N,N-dimethylacrylamide, N,N-dimethylmethacrylamide, 2-acrylamidoglycolic acid monohydrate, 3-acryloylamino-1-propanol, N-hydroxyethyl acrylamide, N[tris(hydroxymethyl)methyl]-acrylamide, N-methyl-3-methylene-2-pyrrolidone, 2-hydroxyethylmethacrylate, 2-hydroxyethyl acrylate, hydroxypropyl acrylate, hydroxypropyl methacrylate, trimethylammonium 2-hydroxy propylmethacrylate hydrochloride, aminopropyl methacrylate hydrochloride, dimethylaminoethyl methacrylate, glycerol methacrylate, N-vinyl-2-pyrrolidone, allyl alcohol, vinylpyridine, acrylic acid, a $C_1$-$C_4$-alkoxy polyethylene glycol(meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

15. The soft contact lens of claim 12, wherein the polysiloxane crosslinker is represented by formula (1)

in which $A_1$ and $A_2$ independent of each other is a linear or branched $C_1$-$C_{10}$ alkyl diradical which optionally comprises one or more hydroxyl or amino groups;

$X_1$ and $X_2$ independent of each other are a linkage selected from the group consisting of a direct bond,

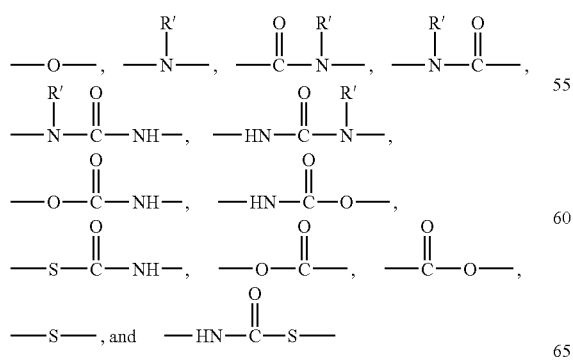

in which R' is H or $C_1$-$C_8$ alkyl;

PDMS is a polysiloxane divalent radical of formula (2)

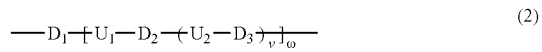

in which v is 0 or 1, ω is an integer of from 0 to 5, $U_1$ and $U_2$ independent of each other represent a divalent radical of —$R'_1$—$X_3$-E—$X_4$—$R'_2$— in which $R'_1$ and $R'_2$ independent of each other is a linear or branched $C_1$-$C_{10}$ alkylene divalent radical, $X_4$ and $X_5$ independent of each other are a linkage selected from the group consisting of —O—,

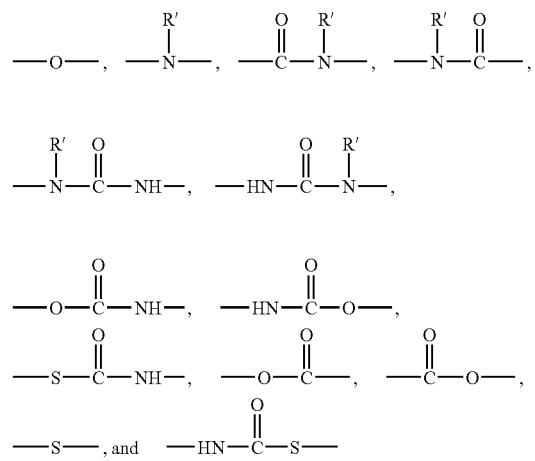

in which R' is H or $C_1$-$C_8$ alkyl, E is an alkyl diradical, a cycloalkyl diradical, an alkylcycloalkyl diradical, an alkylaryl diradical, or an aryl diradical with 1 to 40 carbon atoms which may have ether, thio, or amine linkages in the main chain, $D_1$, $D_2$ and $D_3$ independently of each other is a divalent radical selected from the group consisting of —(CH$_2$CH$_2$O)$_t$—CH$_2$CH$_2$— in which t is an integer of 3 to 40, —CF$_2$—(OCF$_2$)$_a$—(OCF$_2$CF$_2$)$_b$—OCF$_2$— in which a and b independent of each other is an integer of 0 to 10 provided that a+b is a number in the range of 10 to 30, and a divalent segment of formula (3)

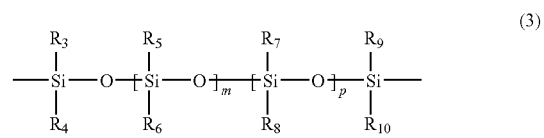

in which $R_3$, $R_4$, $R_5$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), -alk-(OCH$_2$CH$_2$)$_n$—OR$_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700, provided that at least one of $D_1$, $D_2$ and $D_3$ is represented by formula (3); and Q is an ethylenically unsaturated group of formula (4)

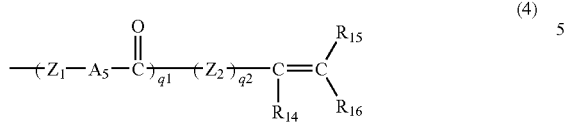
(4)

in which $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —$(CH_2CH_2O)_d$—$CH_2CH_2$— in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is —O— or

in which R' is H or $C_1$-$C_8$ alkyl; $q_1$ and $q_2$ independent of each other are an integer of 0 or 1; $R_{14}$ is hydrogen, $C_1$-$C_4$ alkyl or halogen; $R_{15}$ and $R_{16}$ independent of each other are hydrogen, $C_1$-$C_4$ alkyl, phenyl, carboxy or halogen.

16. The soft contact lens of claim 12, wherein the reactive mixture further comprises a siloxane-containing vinylic monomer of formula (5)

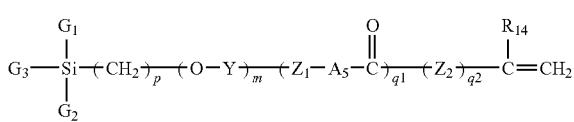
(5)

in which:

$R_{14}$ is H or $CH_3$;

$Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —$(CH_2CH_2O)_d$—$CH_2CH_2$ in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is —O— or

in which R' is H or $C_1$-$C_8$ alkyl;

$q_1$ and $q_2$ independent of each other are an integer of 0 or 1;

Y is a $C_1$-$C_6$ alkylene divalent radical or a $C_1$-$C_6$ alkylene divalent radical containing one or more hydroxyl groups;

m is an integer of 0 to 5, p is an integer of 1 to 6; and $G_1$, $G_2$ and $G_3$ independent of each other are $C_1$-$C_6$ alkyl, phenyl, benzyl, or a radical of formula (6)

(6)

in which $B_1$, $B_2$ and $B_3$ independent of each other are $C_1$-$C_6$ alkyl, phenyl, or benzyl; provided that at least two of $G_1$, $G_2$ and $G_3$ are radicals of formula (6).

17. The soft contact lens of claim 12, wherein the siloxane-containing vinylic monomer is selected from the group consisting of N-[tris(trimethylsiloxy)silylpropyl]methacrylamide, N-[tris(trimethylsiloxy)-silylpropyl]acrylamide, N-[tris(dimethylpropylsiloxy)silylpropyl]acrylamide, N-[tris(dimethylpropylsiloxy)silylpropyl]methacrylamide, N-[tris(dimethylphenylsiloxy)silylpropyl]acrylamide, N-[tris(dimethylphenylsiloxy)silylpropyl]methacrylamide, N-[tris(dimethylethylsiloxy)silylpropyl]acrylamide, N-[tris(dimethylethylsiloxy)silylpropyl]methacrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate), and mixtures thereof.

18. The soft contact lens of claim 12, wherein the reactive mixture further comprises a monoethylenically functionalized polysiloxane vinylic monomer or macromer of formula (7)

(7)

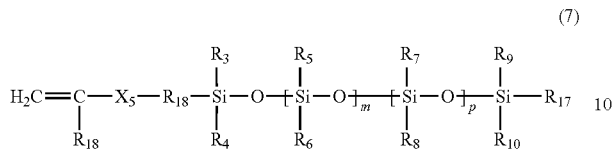

in which $X_5$ denotes —COO—, —CONR$_{19}$—, —OCOO—, or —OCONR$_{19}$—, where each $R_{19}$ is independently H or $C_1$-$C_7$ alkyl; $R_{18}$ denotes a divalent $C_1$-$C_{25}$ alkyl or $C_6$-$C_{30}$ aryl radical, which may interrupted by —O—, —COO—, —CONR$_{14}$—, —OCOO— or —OCONR$_{19}$— and may comprise hydroxy group, primary, secondary, or tertiary amine group, carboxy group, or carboxylic acid; $R_{17}$ is a monovalent $C_1$-$C_{25}$ alkyl or $C_6$-$C_{30}$ aryl radical, which may interrupted by —O—, —COO—, —CONR$_{19}$—, —OCOO— or —OCONR$_{19}$— and may comprise hydroxy group, primary, secondary, or tertiary amine group, carboxy group, or carboxylic acid; $R_3$, $R_4$, $R_5$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), -alk-(OCH$_2$CH$_2$)$_n$—OR$_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700.

19. A method for producing soft contact lenses, comprising the steps of:
providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
introduce a lens-forming material into the cavity, wherein the lens-forming material comprises an actinically crosslinkable prepolymer which is a RAFT polymerization product of a reactive mixture comprising a polysiloxane crosslinker with two terminal vinyl-groups, a hydrophilic vinylic monomer, a RAFT agent, and a free-radical initiator, wherein the molar ratio of the RAFT agent to the polysiloxane crosslinker in the reactive mixture is from about 0.005 to about 0.1, wherein the prepolymer comprises (1) polysiloxane crosslinking units derived from the polysiloxane crosslinker both the two terminal vinyl-groups of which undergo the RAFT polymerization, (2) hydrophilic units derived from a hydrophilic vinylic monomer, and (3) dangling polysiloxane chains each with one terminal vinyl group, wherein the dangling polysiloxane chains are derived from the polysiloxane crosslinker one of the two terminal vinyl-groups of which undergoes the RAFT polymerization while the other remains unreacted; and
actinically irradiating the lens forming material in the cavity to form a contact lens.

* * * * *